(12) United States Patent
Basak et al.

(10) Patent No.: US 7,917,338 B2
(45) Date of Patent: Mar. 29, 2011

(54) DETERMINING A WINDOW SIZE FOR OUTLIER DETECTION

(75) Inventors: Jayanta Basak, New Delhi (IN); Martin Keller, Vaihingen (DE); Laurent Sebastien Mignet, New Delhi (IN); Sourashis Roy, Karnataka (IN)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 11/970,003

(22) Filed: Jan. 7, 2008

(65) Prior Publication Data

US 2008/0167837 A1      Jul. 10, 2008

(30) Foreign Application Priority Data

Jan. 8, 2007  (EP) .................................. 07100228

(51) Int. Cl.
*H04B 15/00*   (2006.01)
(52) U.S. Cl. ....................... 702/190; 702/189
(58) Field of Classification Search .............. 702/189, 702/190
See application file for complete search history.

(56) References Cited

U.S. PATENT DOCUMENTS

| | | | | |
|---|---|---|---|---|
| 6,055,491 A * | 4/2000 | Biliris et al. | ................. | 702/176 |
| 6,556,957 B1 * | 4/2003 | Daumer | ................. | 702/193 |
| 2003/0004902 A1 | 1/2003 | Yamanishi et al. | | |
| 2005/0137830 A1 | 6/2005 | Moessner et al. | | |
| 2005/0137835 A1 | 6/2005 | Moessner | | |
| 2005/0160340 A1 | 7/2005 | Abe et al. | | |
| 2005/0193281 A1 | 9/2005 | Ide et al. | | |
| 2005/0222806 A1 | 10/2005 | Golobrodsky | | |
| 2006/0033967 A1 | 2/2006 | Brunner | | |
| 2006/0085155 A1 | 4/2006 | Miguelanez et al. | | |

FOREIGN PATENT DOCUMENTS

WO        WO99/67758 A1      6/2005

OTHER PUBLICATIONS

Lehr, T. F., et al. "Fast and Automatic Identification of Performance Outliners in Trace Data", IBM TDB v38 n2 02-95 p. 409-410, IP.Com IPCOM000114929D, Mar. 30, 2005.

Bahl, LR. et al. "Improved Procedure for Outlier Detection in a Database of Label Sequences Derived from Spoken Utterances", IBM, TDB v4a 09-92, p. 396-397, IP.Com IPCOM000109636D, Mar. 24, 2005.

(Continued)

*Primary Examiner* — Eliseo Ramos Feliciano
*Assistant Examiner* — Janet L Suglo
(74) *Attorney, Agent, or Firm* — Steven L. Nichols; Van Cott, Bagley, Cornwall & McCarthy P.C.

(57) ABSTRACT

A window size for outlier detection in a time series of a database system is determined. Strength values are calculated for data points using a set of window sizes, resulting at least in one set of strength values for each window size. The strength values increase as a distance between a value of a respective data point and a local mean value increases. For each set of strength values, a weighted sum is calculated based on the respective set of strength values. A weighting function is used to suppress the effect of largest strength values and a window size is selected based on the weighted sums.

16 Claims, 5 Drawing Sheets

OTHER PUBLICATIONS

Lon-Mu Liu, "Time Series Analysis and Forecasting", ISBN:0-9765056-6-5, Scientific Computing Associates Corp., chapter 7, Apr. 2006.

Justel, Ana, et al. "Detection of Outlier Patches in Autoregressive Time Series", Statistica Sinica II (2001) p. 651-673.

Liu, X. et al. "Modelling Multivariate Time Series", Department of Computer Science, Birkbeck College, University of London, Malet Street, London WC1E 7HX, United Kingdom.

* cited by examiner

| Time (ms) | 109 | 110 | 437 | 1 469 | 5 171 | 21 500 | 34 844 | 59 750 |
|---|---|---|---|---|---|---|---|---|
| Number data | 1000 | 2000 | 5000 | 10 000 | 20 000 | 50 000 | 70 000 | 100 000 |

700

Calculate strength values for data points using a set of window sizes, resulting at least in one set of strength values for each window size, the strength values increasing as a distance between a value of a respective data point and a local mean value increases (step 705)

Calculate, for each set of strength values for each window size, a weighted sum based on the respective set of strength values using weighting function suppressing effect of largest strength values (step 710)

Select a window size based on the weighted sum (step 715)

END

Fig. 7

DETERMINING A WINDOW SIZE FOR OUTLIER DETECTION

BACKGROUND OF THE INVENTION

The invention relates to a method for determining a window size for outlier detection.

Preprocessing of data is an important task prior to any data analysis. In time series data analysis, one part of preprocessing consists of removing outliers from a data set being analyzed. An outlier is a data point or measurement that falls outside of the range of most of the data points or measurements in the data set. Without outlier handling, traditional data analysis may fail because outliers will distort the variance of other data in a data set. For instance, doing a trend analysis requires detection and removal of outliers. Otherwise a trend prediction will become strongly influenced by a small number of outlier data points that are not at all representative for the complete data set.

Outlier detection is usually not difficult for a human. However, it can be difficult for a computer program to automatically detect outliers. Traditional outlier handling is not well adapted to handle data sets generated by typical database monitoring systems. Although data may be aggregated in a so-called data warehouse on a continuing basis, there are times during normal data warehousing operation when large data sets (data blocks) are created on a recurring basis. The occurrence of data blocks, even if anticipated, nevertheless results in a dramatic workload change for a significant period of time.

Data blocks can be generated when a database system suspends the normal task of aggregating input data in order to perform other tasks (such as data consolidation operations, backup operations, overnight batch jobs, etc.) that may be performed infrequently but that result in the creation of data blocks each time they are performed. Tasks of this type may be performed on a regular, recurring basis (for example, daily, weekly, monthly, etc.) or on an as-needed basis.

Although the analysis of such data blocks can place heavy demands on data processing resources, the detection and removal of outliers must still be performed.

Automatic outlier detection involves establishing a window and detecting if outliers exist inside within the window. The main problem is deciding how big the window should be. The present invention fills a need for a flexible and efficient method for determining an appropriate window size for outlier detection as well as a need for an outlier detection method that can handle blocks of data points with extreme values.

The invention may also be implemented as a computer program product for outlier detection for time series in database systems. The computer program product includes a computer usable medium embodying computer usable program code configured to perform a local search for outliers on a sliding window with a window size (w), code configured to maintain a data structure representing the degree to which a value of a measuring point can be an outlier, code configured to measure an uncertainty in the data structure, code configured to optimize the window size by maximizing the uncertainty, and code configured to detect outliers with a given threshold.

BRIEF SUMMARY OF THE INVENTION

The invention may be embodied as a method for determining the window size for outlier detection in a time series of a database system. Strength values for data points are calculated using a set of window sizes, resulting in at least one set of strength values for each window size. The strength values increase as a distance between a value of a respective data point and a local mean value increases. For each set of strength values, a weighted sum is calculated based on the set of strength values using a weighting function to suppress the effect of the largest strength values. A window size is selected based on the weighted sum.

The invention may also be embodied as a method for outlier detection for time series in database systems. A local search is performed for outliers on a sliding window with a window size (w). A data structure is maintained representing the degree to which a value of the measuring point can be an outlier. An uncertainty in the data structure is measured in the window size is optimized by maximizing the uncertainty. Outliers are detected with a given threshold.

The invention may also be implemented as a data processing system for determining a window size for outlier detection in a time series of a database system. The data processing system includes means for calculating strength values for data points using a set of window sizes and resulting in at least one set of strength values for at least a subset of window sizes. The strength values increase as the distance between a data point and a local mean value increases. A weighted sum is calculated for each set of strength values, using a weighting function to suppress the effect of largest strength values. A window size is selected based on the weighted sum.

The invention may also be implemented as a computer program product for determining a window size for outlier detection in a time series of a database system. A computer program product includes a computer usable medium embodying computer usable program code configured to calculate strength values for data points using a set of window sizes and resulting in at least one set of strength values for at least one subset of window sizes, the strength values increasing as the distance between a data point and a local mean value increases. The computer program product further includes code configured to, for each set of strength values, calculate a weighted sum using a weighting function to suppress the effect of largest strength values, and code configured to select a window size based on the weighted sum.

BRIEF DESCRIPTION OF THE SEVERAL VIEWS OF THE DRAWINGS

FIG. 7 is a flowchart diagram of an illustrative method of determining a window size for outlier detection, according to one exemplary embodiment of the principles described herein.

DETAILED DESCRIPTION OF THE INVENTION

Figure 1:
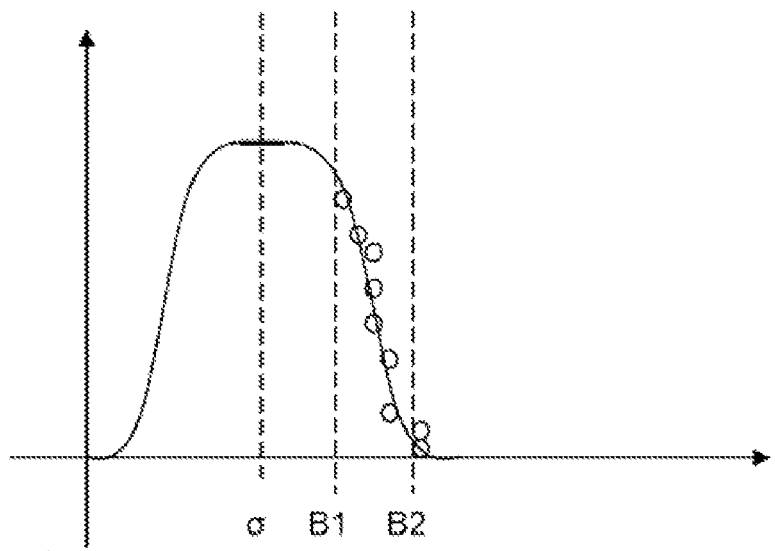
FIG. 1 is an illustration of a distribution function of data points with extreme values.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. As used in the present specification and in the appended claims, the term "storage medium" excludes a signal per se. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

One possible solution to the problem of handling outliers involves the use of smaller partitions, also referred to as windows, of the time series to do the outlier processing. However, the choice of the correct (optimum) window size presents difficulties. What works in some situations, will not work in other situations, even if an identical performance measure, a so called key performance indicator KPI, is used in all of the situations.

It has been found that optimum window size is specific for each dataset. In successive iterations, an approach can be used where the window size depends on the size of the time-series. It becomes clear that there is a non-linear correlation between the optimum window size and the size of the data. This approach works better, but may fail when switching from one KPI to another. The chosen window sizes are identical and also the data sizes. Both approaches fail in praxis.

A method according to a first aspect of the invention determines the optimum window size for a given time series. The optimum window size is defined such that a maximum information content of data points with extreme values is determined, i.e. that the optimum window size is chosen in a way that as many data points as possible with extreme values are included within the window. This results in fewer data points being treated as outliers than was the case with prior art handling using the complete time series to determine outliers.

To determine an optimum window size $w_{opt}$, it has first to be clarified when a value of a data point is considered extreme. A value is considered extreme if it deviates from an expected value. The more it deviates, the more extreme is the value. The expected value may be the mean value m of the data values x in the window with the window size w. The deviation is explained by a multiple $\epsilon$ of a standard deviation $\sigma$ of the data in the window.

A value x is extreme if $$|x-m|>\sigma*\epsilon$$

wherein m is the mean value, $\sigma$ is the standard deviation and $\epsilon \in \{1.0, \ldots 3.0\}$. If required, other values for $\epsilon$ can be chosen.

This is indicated in FIG. 1. Values which are above a first border line B1 and below a second borderline B2 are considered as extreme values. Values above the second borderline B2 can be but need not necessarily be outliers. Values below the first borderline B1 are not of interest for the determination of the optimized window size w.

The invention focuses on values between B1 and B2 according to a first embodiment, whereas the second embodiment considers outliers which are above the second borderline B2.

A measure of how likely a value is to become extreme or exceptional may be the result of deviation detection, such as disclosed in the U.S. Pat. No. 6,892,209 A1, yielding a standardized residual approach. This approach measures the likelihood a measured value (data point) will be categorized as exceptional by standardizing the residual between the expected value and the actual value.

The likelihood a value x will be considered extreme is $|x-m|/\sigma$, wherein again, m is the mean value and $\sigma$ is the standard deviation. Considering the two definitions given above, a new strength E is defined such that only extreme values are taken into account. Thus, the strength E of a value x to become extreme is $$E = \begin{pmatrix} 0, & |x-m| \leq \sigma * \varepsilon \\ |x-m|/\sigma, & |x-m| > \sigma * \varepsilon \end{pmatrix}$$

wherein again, m is the mean value, $\sigma$ is the standard deviation and $\varepsilon \in \{1.0, \ldots 3.0\}$. In principle, other values for $\varepsilon$ can be chosen.

The method works as follows:

1. Input of a time series of values $x(1), x(2), x(3), \ldots, x(n)$, and output of a modified time series with the detected outliers, where n is the number of data points in the time series;

2. define an array of strength values $E[1, \ldots, n]$ equal to the size of the time-series and initialize the array $E[1, \ldots, n]$ to zero (the array of strength values $E[1, \ldots, n]$ is also called a set of strength values);

3. for all $i \in \{1, \ldots, n\}$ get a truncated time series $Wp=[x(p), x(p+1), \ldots, x(p+w)]$, such that $i=p+k$, with k is constant for all i's, except for the i's, where $i<k$, use the window of $i=k$, and for $i>n-k$, use the window $i=n-k$;

4. calculate the strength $E[i]$ $$E[i] = \begin{pmatrix} 0, & |x(i)-m_w| \leq \sigma_w * \varepsilon \\ |x(i)-m_w|/\sigma_w, & |x(i)m_w| > \sigma_w * \varepsilon \end{pmatrix}$$

Figure 2:
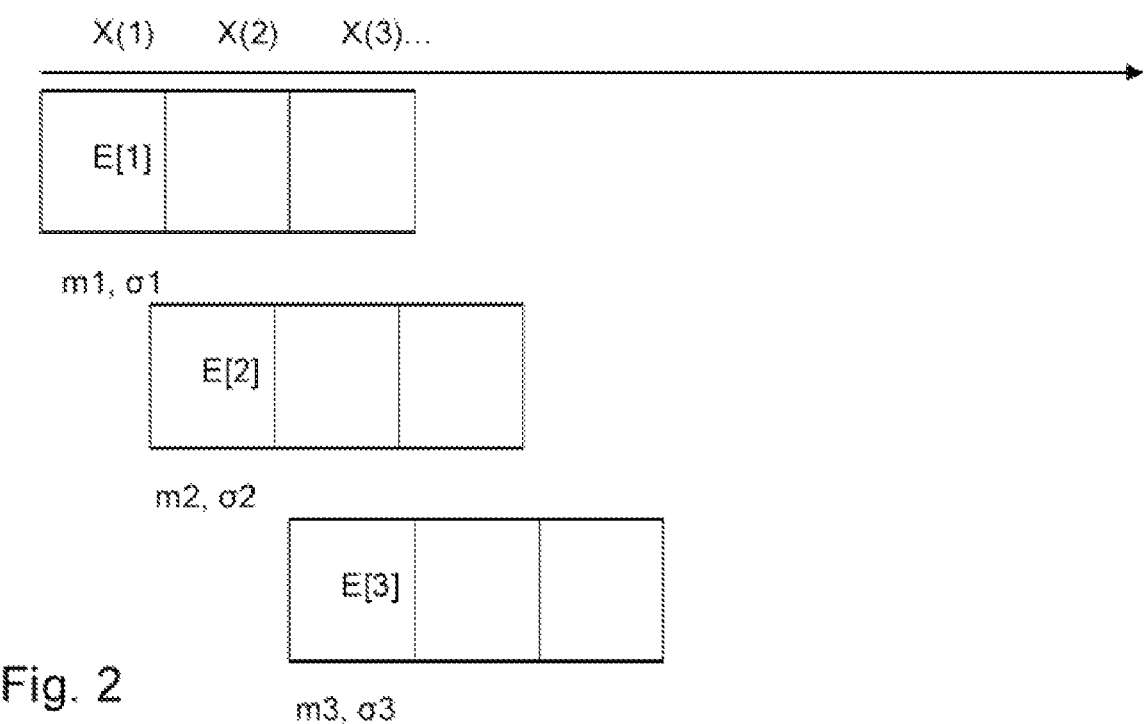
FIG. 2 is an illustration of an incremental calculation of a local mean value and a standard deviation value and a constant position of xi within a window of size w=3 for calculating E[i].

For a given window size w, each strength value $E[i]$ may be calculated for the same position with respect to the window (e.g. $E[i]$ for $x(i)$ is always in the first position in the window, as exemplified in FIG. 2).

FIG. 2 illustrates an incremental calculation of local mean values m and standard deviation values $\sigma$ and a constant position of $x(i)$ within a window for calculating $E[i]$. In the figure, the window size w is w=3 with three members of the time series $x(1), x(2), x(3)$. In the upper part indicating the first window position a mean value m1, a standard deviation $\sigma$1 and a strength value $E[1]$ are calculated. In the middle, a mean value m2, standard deviation $\sigma$2 and strength $E[2]$ are calculated for a second window position. The mean value m2 and standard deviation $\sigma$2 are calculated incrementally using m1 and $\sigma$1 of the first window position, whereas in the third (lower) window position a mean value m3, standard deviation $\sigma$3 and strength $E[3]$ are calculated using m2, $\sigma$2.

A threshold for an "extreme value" (values for $\varepsilon$) $x(i)$ can be selected independently from the threshold used in the outlier detection algorithm, as long as the extreme value threshold is smaller than the outlier threshold.

Let $E_w[1, \ldots, n]$ be represented as the array obtained for a certain window size w. The array is normalized such that $$c^w(i) = \frac{E_w[i]}{\max(E_w[1, \ldots, n])}$$

evidently, for all i, $0 \leq c^w(i) \leq 1$. Normalization can be a separate step or made as a part of the calculation of strength values $E[i]$. The normalization step results in standardized values between 0 and 1. With this standardization the results for different window sizes w become comparable to each other.

In order to optimize the window such that the window size w contains the most evidence to be extreme, but not necessarily an outlier, the parameter $c^w(i)$ is treated as a probability to become extreme.

The content of information of the time-series $x(i)$ is defined using a weighting function $g(c)$ to search the optimum window size $w_{opt}$ $$D_w = \sum_{i=1}^{n} g(c^w(i))$$

with Lemma G1: $g(c_{\varepsilon*s}) > g(c=1)$ and $g(c=0) = g(c=1)$. $D_w$ represents one window with size w.

Different weighting functions can be used. All of them have to fulfill the lemma that values near to the 'borderline to become extreme', $\varepsilon*\sigma$, are weighted more than values tending to become most extreme ($c \to 1$). This weighting ensures that values having the highest probability to become extreme are weighted less than the others.

By summing up all the weighted probabilities $c^w(i)$ from all members of a time series $x(i)$, the information content is received for a specific window size w determining how much extreme value information can be obtained with this specific window size w while minimizing the influence of the most extreme values.

The simplest weighting function which can be used is:

$g(c)=1-c$ for $c \ne 0$ and $g(0)=0$, fulfilling Lemma G1.

An alternative weighting function is the entropy measure to search the optimum window size $w_{opt}$, with $g(c)=-c*\log(c)$ Using the entropy approach as optimum weighting criteria ensures that only this window size $w_{opt}$ is selected which provides most extreme content information but tends to be not most extreme. Looking at the density distribution of entropy reveals that values tending to be most extreme are weighted less than values near the entropy borderline $\varepsilon*\sigma$. The maximum weight is between the borderline $c_{\varepsilon*\sigma}^{w} \leq 0.5$ and the maximum $c_{max}^{w} = 1.0$.

After weighting the information content of a window to have become extreme but not most extreme, the optimal window size $w_{opt}$ with the maximum information content is determined $w_{opt} = \arg\max_w D_w[1, \ldots, n]$.

The optimal window size $w_{opt}$ yields the particular window size w for which the maximum information content to become extreme but not become an outlier in the time-series $x(i)$ with particular gradation can be detected, i.e., the optimum window size $w_{opt}$ physically gives the maximum flexibility for deciding about the outliers.

For performance optimization reasons, a global search with arg max can be replaced by an localized optima search within boundaries T1 and T2, only for a subset of window sizes, such that $$w_{opt} = \mathrm{argmax}_w D_w |_{T1}^{T2}.$$

For instance, by selecting a start value for the localized search as $$Os\sqrt{n}$$

and defining parameters T1=0 and T2=2*Os, a total performance of $O(T) < n^{3/2}$ is received, with n being the number of time series data points.

A set up is made and a test performed where the time is measured to calculate the optimum window size $w_{opt}$. Subsequently, it is reasonable to do the outlier handling using the optimum window size $w_{opt}$. The data are in memory and the localized optima search is used. Test results are shown in the table in FIG. 4, indicating the performance evaluation and the scalability of the method.

The model quality was tested on multiple KPI's from different sources (for example warehouses) taking into account the various time series sizes. Additionally, tests were performed on synthetic data where data with a normal distribution are generated using random generators. Blocks with extreme values using different block sizes and different time series lengths are added to these data.

Figure 3A:
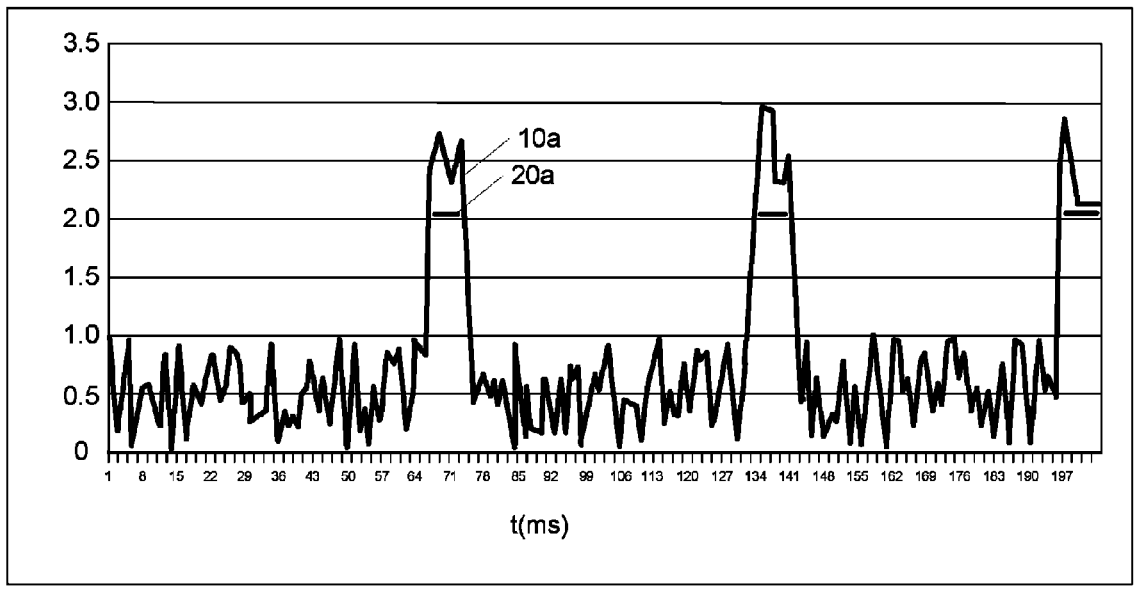
FIG. 3, consisting of FIGS. 3A and 3B, is a comparison of a state of the art outlier handling to outlier handling according to the present invention.
Figure 3B:
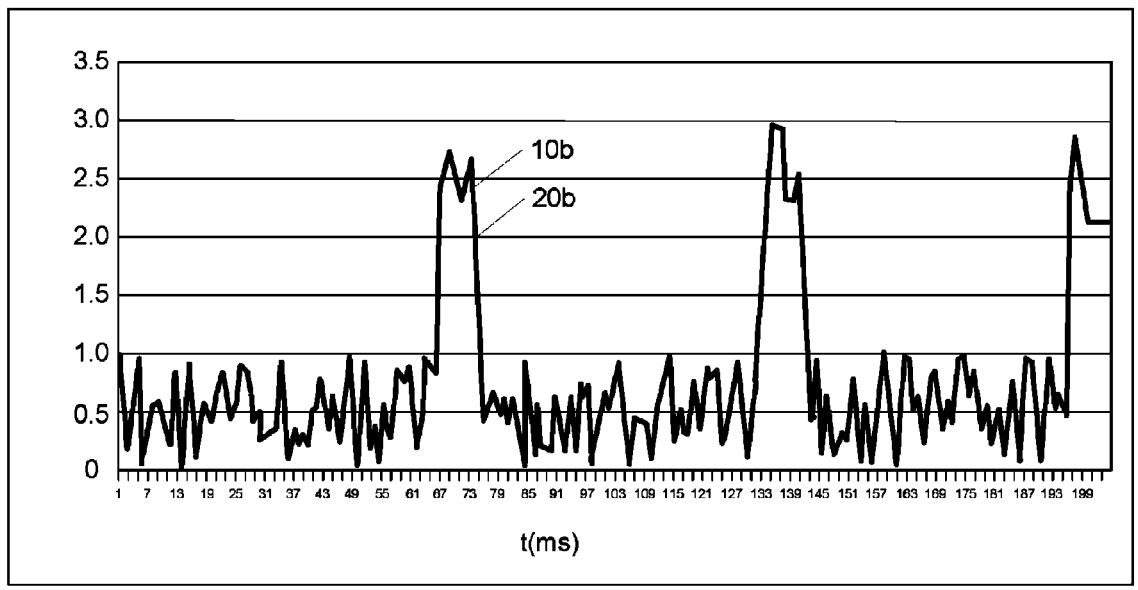

Results of these tests are shown in FIGS. 3A and 3B, giving a model quality comparison. FIG. 3A depicts results on prior art outlier handling as time dependent measured values x (line 10a) compared to model values (dashed line 20a), where blocks of values with most extreme values are not properly represented by the model calculations. This can be seen near the maximum values around 70, 130 and 195 ms. The prior art outlier handling treats these blocks as outliers and therefore truncates these data erroneously.

The outlier handling results according to the invention are depicted in FIG. 3B. The data points with values x (line 10b) are much better reproduced by the model values (dashed line 20b) using the optimum window approach as by the prior art model. The optimized window approach does not treat these blocks as outliers, instead these blocks are reliably treated as data points with extreme values.

The method according to the invention is very sensitive. For instance, looking at the first block near 70 ms of extreme values, the last spike (a single data point) is treated as outlier but the rest of the block is not. This happens also in the second block around 130 ms. These results show that this approach according to the first embodiment of the invention provides improved outlier handling which can distinguish between single outliers and blocks of extreme values.

According to the first embodiment of the invention described above, a data structure is maintained for each window size w, a weighted sum of the data structure for each window size is calculated, a window size $w_{opt}$ is selected based on the weighted sum and outliers are searched for using the selected window size.

Additionally, a definition for strength values E is given. The data structure stores values x for data points for various window sizes w. The outlier detection method is not needed in determining these strength values E. The outlier detection may be carried out only once, after the window size w has been selected. The weighting function suppresses the effect of large strength values.

Another embodiment of the method according to a second aspect of the invention is described below.

Database performance management tools, one example of which is IBM® DB2® Performance Expert from International Business Machines Corporation, can be used in storing historical data. Historical data are preprocessed in order to be analyzed. The preprocessing can occur as input of further processing or as a temporary step where the pre-processed data are stored for further usage.

Removing outliers is an important part of any preprocessing. By increasing the quality of this step the prediction quality will be increased as well as the customer satisfaction.

Figures 4, 5:
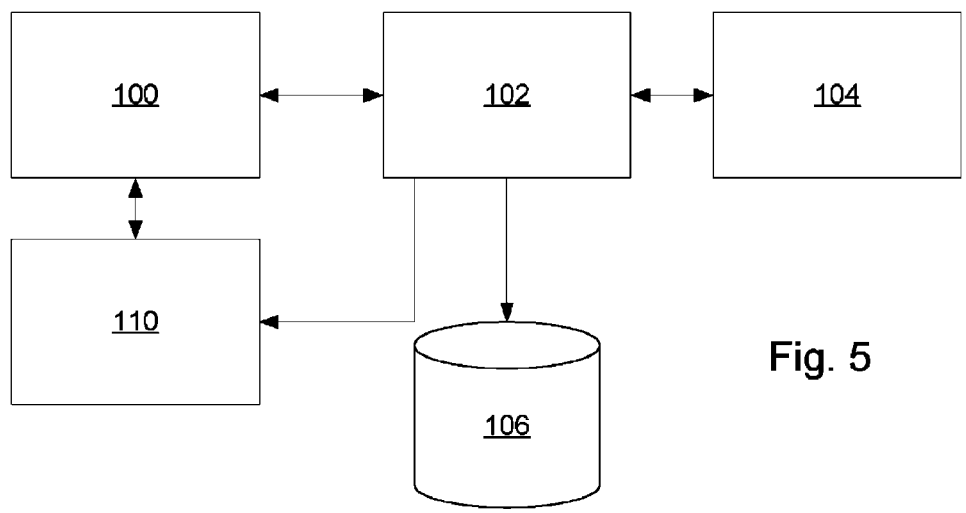
FIG. 4 is a table with test results received from an outlier detection method according to the present invention.
FIG. 5 is an apparatus for outlier detection according to an embodiment of the present invention.

The invention integrates easily with a current setup as shown in FIG. 5. The invention integrates itself naturally in known architectures.

Before any deep analysis by a Trend Analyzer module 100, the module 110 in charge of implementing the invention disclosed pre-process the time series given in input and output a time series without any anomalies due to outliers. These data are transmitted do a client 102, for example a DB2 Performance Expert client, which interacts with a user 104 and receives data 106.

In this manner the module 110 can also be used before any analysis currently done by the tools (generations of reports, etc.) in the future.

Moreover any process analyzing time series can potentially use the method disclosed to improve the quality of the analysis.

Let a time-series be denoted by x(1), x(2), x(3), . . . , x(n) where n is the length of the time-series (number of data points). The time-series x(i) is considered as observable at equal intervals. As mentioned above, if all points are considered globally, then it is very difficult to detect the outliers without model fitting. In other words, the outliers can be defined with respect to a regularized non-linear model describing the time-series. In the case local windows around a certain point are considered, say x(i), then the major question is how to select a size w of the window with respect to which the outliers can be defined. If the size of the window is increased then the signal itself may appear as noise.

The method according to the second aspect of invention works as follows.

1. Input is a time series x(1), x(2), x(3), . . . , x(n), the output is the modified time series with the detected outliers;

2. a user defined parameter is a window size w. The window size w can also be automatically set which is discussed below;

3. define an array CO[1, . . . , n] equal to the size of the time-series. The array CO[1, . . . , n] is initialized to zero.

4. initialize a variable p=1;

5. get a truncated time series Xp=[x(p), x(p+1), . . . , x(p+w)];

6. determine the outliers in Xp. This is a critical step in the sense that any method can be applied to determine the outliers in Xp. For example, one can consider the deviation from the mean by a factor of $2\sigma_p$ where $\sigma_p$ is the standard deviation computed only in Xp. Instead of $2\sigma_p$, one can also consider $3\sigma_p$. The outliers in the local window Xp can also be detected by certain model fitting. Note that no new technique is being for detecting outliers in the local window. Any model-based or model-free technique to detect outliers in the local window Xp can be applied;

7. for all i ∈ {p, p+1, p+2, . . . , p+w}, if i is an outlier in Xp, then make CO[p]=CO[p]+1;

8. set p=p+1;

9. if p≦n−w then go to step 5.

Evidently, one can see that for any i, 0≦CO[i]≦w. The value of CO determines the grade with which a value x of a point i can be considered to be an outlier. We can decide which points i to be removed based on the grade of a point i. Otherwise, one can also decide based on the fact that top k % points i can be removed based on certain choice of k.

The next question is how to decide on the window size w. The upper bound of CO is not always w. For example, if w=n, then the upper bound is only 1. On the other hand, if a very low window size w is chosen, then also the upper bound is very low. The higher the upper bound of CO is, the better the gradation of the outliers can be. Additionally, with a higher range of gradation of the outliers more information about the nature of the noise in the particular time-series can be achieved. The setting of the window size w can be regarded in various ways depending on the model fitting on the time-series. Favorably, a model-free approach is addressed for obtaining the optimal window size w simply based on getting the maximum information from the time-series.

One approach is independent of the time-series information. One can have a maximum value of CO when w=n−w. Therefore, one can choose w=n/2. However, this is a not a good method because it does not consider anything about the nature of the time-series (even if model-free approach is considered, one may not afford to ignore the data).

The second approach described considers the time-series x(i) itself. There can be different values of CO for different values of w, and each CO represents certain gradation of the nature of noise or the vagueness about the time series. Let represent $CO_w$ as the array obtained for certain window size w. Note that the length of CO is always n. The array is normalized such that $$c^w(i) = \frac{CO_w[i]}{\max\{CO_w[1, \ldots, n]\}}$$

evidently, for all i, $0 < c^w(i) \leq 1$.

The content of information or vagueness $H_w$ in the time-series is defined by the entropy measure as $$H_w = -\sum_{i=1}^{n} c^w \log(c^w(i))$$

The optimal window size $w_{opt}$ is chosen such that $$w_{opt} = \operatorname{argmax}_w H_w[1, \ldots, n]$$

The optimal window size $w_{opt}$ gives the particular window size w for which the maximum noise in the time-series with particular gradation can be detected, i.e., the optimum window size $w_{opt}$ physically gives the maximum flexibility for deciding about the outliers.

All the methods for outlier detection address the problem of selecting a point either as outlier or not outlier, independent of whether it is model-based or model-free. The local outlier detection method also considers a window centered around one point to decide whether that particular point in question can be flagged as outlier or not. No existing method attributes the points with a gradation of vagueness $H_w$ of becoming outliers and then judge the information content to decide whether the current local window is optimal or not.

The method described here is for outlier detection which can embed any technique. It may be restricted to a fixed window size across the time-series at a time. It is possible that different window-sizes at different locations are considered. The main question is how to do this extension. It can be seen that the noise or vagueness $H_w$ with a two-dimensional array c[w,n] is measured, and measuring the entropy Hw along one dimension only. It is possible to fix a point and measure the entropy $H_w$ across the dimension w, i.e., the information content column-wise for different window sizes.

This section presents more details of a current integration of the implementation of the method in a database performance monitoring product such as the IBM DB2 Performance Expert product.

In this product, a user 104 interacts with the system (FIG. 4) and the system performance depends on various parameters such as memory usage, CPU time, caching for example. These parameters govern the effective usage of the system and are monitored by the DB2 Performance Expert tool. The objective is to provide an early warning kind of the system to the user 104 of DB2 Performance Expert about the future usage of certain resources so that the user 104 can make effective prediction of the available resources in time such as early detection of crossing a threshold. In order to do so, it is essential to know in advance how the parameters are going to change in the system and track these changes in advance. Hence, trend analyses of these parameters are necessary. If the parameters are viewed over units of times then these represent some kinds of discrete time series and in effect the problem is to do time series analysis and compute both the trends hidden in the data as well as the prediction of future values.

The method here is used for removing outliers from this time series data provided as an input to the Trend Analyzer module in the DB2 Performance Expert product. In order to determine the optimum window size $w_{opt}$ (length) required for outlier detection only a limited portion of the data is used. Then use is made of this optimum window size $w_{opt}$ to detect outliers for the entire data set. Here the assumption is made that the distribution of the data remains same over the entire time line. The optimum window size $w_{opt}$ determined from a portion of the time series will therefore be applicable to the entire series. The outlier detection module in the DB2 PE Trend Analyzer 100 also supports the fixed window length approach described above. In this approach no attempt is made to find the optimum window size $w_{opt}$. Instead $$\frac{n}{2}$$

as window size w is used for outlier detection, where n is the number of points in the time series data. Additionally the module also supports a global outlier detection scheme. In this scheme, while trying to detect outliers instead of having a sliding window approach as described earlier, the entire time series as a whole is considered and the outliers are determined.

The method for outlier detection in time series comprises the steps of locally searching for outliers on sliding windows, maintaining a data structure $C_w$ representing the degree to which a point can be an outlier, measuring the uncertainty $H_w$ in $C_w$, optimizing windows size w by maximizing $H_w$ and detecting outliers with a given threshold.

The method can be implemented for any model-based or model-free technique for local outlier detection in a window of size W for a local search for outliers on sliding windows w and can be applied to any scheme representing a sliding window for performing the local search for outlier detection.

The data structure $C_w$ representing the degree to which a point can be an outlier can be any static or dynamic data structure representing an array of elements (such as array, linked list, hash table, vector).

The uncertainty (vagueness) $H_w$ can be any uncertainty measure such as logarithmic entropy (Shannon's entropy) or any fuzzy entropy measure (such as quadratic entropy) or any fuzzy ambiguity measure).

According to the second embodiment of the invention described above, a data structure is maintained for each window size, a weighted sum of the data structure for each window size is calculated (which is given as the entropy $H_w$), a window size w is selected based on the weighted sums and outliers are searched for using the selected window size. The data structure $C_w$ represents the degree to which point an outlier can be.

Figure 6:
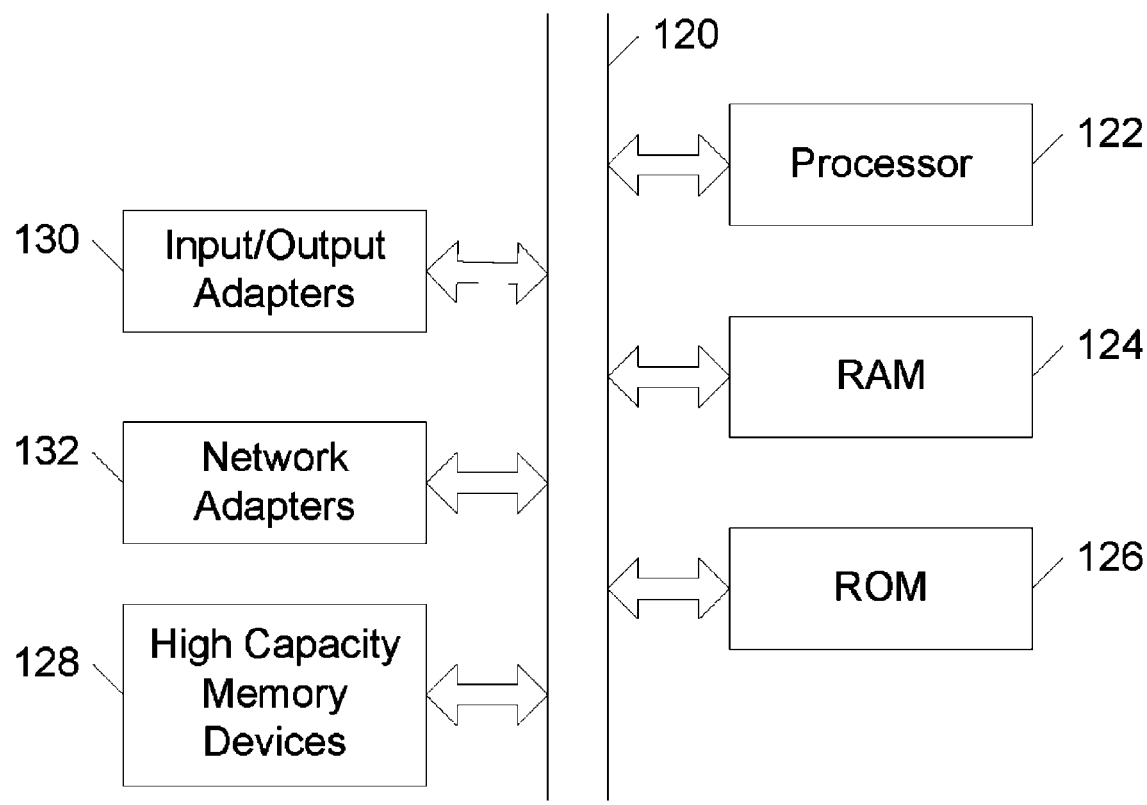
FIG. 6 is a schematic representation of the major hardware components of a general purpose computer system that could be employed in implementing the present invention.

The invention may be implemented by running software on a general purpose computer system having a functional infrastructure of the type shown in FIG. 6. The infrastructure includes a system bus 120 that carries information and data among a plurality of hardware subsystems including a processor 122 used to execute program instructions received from computer applications running on the hardware. The infrastructure also includes random access memory (RAM) 124 that provides temporary storage for program instructions and data during execution of computer applications and are read only memory (ROM) 126 often used to store program instructions required for proper operation of the device itself, as opposed to execution of computer applications. Long-term storage of programs and data is provided by high-capacity memory devices 128, such as magnetic hard drives or optical CD or DVD drives.

In a typical computer system, a considerable number of input/output devices are connected to the system bus 120 through input/output adapters 130. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 132 that are used to connect the system to other computer systems through intervening computer networks.

Referring now to FIG. 7, a flowchart diagram is shown of an illustrative computer-implemented method (700) for determining a window size for outlier detection, according to the principles described above. The method (700) begins by calculating (step 705) strength values for data points using a set of window sizes, resulting at least in one set of strength values for each window size. The strength values increase as a distance between a value of a respective data point and a local mean value increases. A weighted sum is calculated (step 710) for each set of strength values based on the respective set of strength values using a weighting function that suppresses the effect of the largest strength values. Then, a window size is selected (step 715) based on the weighted sum.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implemented method for determining a window size for outlier detection in a time series of a database system managed by a processor, said method comprising:
    calculating strength values for data points with said processor using a plurality of window sizes, resulting at least in a plurality of strength values for each window size, said strength values increasing as a distance between a value of a respective data point and a local mean value increases;
    calculating, for each said plurality of strength values associated with a said window size, a weighted sum based on the respective plurality of strength values with said processor using a weighting function suppressing effect of largest strength values, and
    selecting a window size with said processor based on said weighted sum.

2. A method according to claim 1, wherein said plurality of window sizes comprises all window sizes.

3. A method according to claim 1, further comprising applying the selected window size for local outlier detection.

4. A method according to claim 3, further comprising normalizing each said plurality of strength values associated with a said window for enabling comparison of said pluralities of strength values.

5. A method according to claim 4, further comprising providing a lower threshold for assigning a strength value to the value of a data point.

6. A method according to claim 5, wherein said strength values are dependent on respective distances between the values of data points and a local mean value and on a local standard deviation.

7. A method according to claim 6, further comprising calculating local mean values and standard deviation values for a next window position in the time series based on local mean values and standard deviation values calculated for a previous window position in the time series.

8. A data processing system for determining a window size for outlier detection in a time series of a database system, said data processing system comprising:
   at least one processor, said at least one processor being configured to:
      calculate strength values for data points using a plurality of window sizes, resulting at least in a plurality of strength values for each of said window sizes, said strength values increasing as a distance between a value of a respective data point and a local mean value increases,
      calculate, for each said plurality of strength values associated with a said window size, a weighted sum based on the respective plurality of strength values using a weighting function suppressing effect of largest strength values, and
      select a window size based on said weighted sum.

9. A computer program product for determining a window size for outlier detection in a time series of a database system, said computer program product comprising a computer readable storage medium having computer usable program code embodied therewith, said computer usable program code comprising:
   computer usable program code configured to calculate strength values for data points using a plurality of window sizes, resulting at least in one plurality of strength values for each of said window sizes, said strength values increasing as a distance between a value of a respective data point and a local mean value increases;
   computer usable program code configured to calculate, for each said plurality of strength values associated with a said window size, a weighted sum based on the respective plurality of strength values using a weighting function suppressing effect of largest strength values, and
   computer usable program code configured to select a window size based on said weighted sum.

10. A computer program product according to claim 9, further comprising computer usable program code configured to applying the selected window size for local outlier detection.

11. A computer program product according to claim 10, further comprising computer usable program code configured to normalize each set of strength values for enabling comparison of said sets of strength values.

12. A computer program product according to claim 11, further comprising computer usable program code configured to provide a lower threshold for assigning a strength value to the value of a data point.

13. A computer program product according to claim 12, wherein said strength values are dependent on respective distances between the values of data points and a local mean value and on a local standard deviation.

14. A computer program product according to claim 13, further comprising computer usable program code configured to calculate local mean values and standard deviation values for a next window position in the time series based on local mean values and standard deviation values calculated for a previous window position in the time series.

15. A computer-implemented method for outlier detection for time series in a database system managed by a processor, said method comprising:
   performing a local search with said processor for outliers on a sliding window with a window size;
   maintaining a data structure with said processor representing the degree to which a value of a measuring point can be an outlier;
   measuring an uncertainty in said data structure with said processor;
   optimizing window size with said processor by maximizing the uncertainty; and
   detecting outliers with a given threshold with said processor.

16. A computer program product for outlier detection for time series in database systems comprising a computer readable storage medium having computer usable program code embodied therewith, said computer usable program code comprising;
   computer usable program code configured to perform a local search for outliers on a sliding window with a window size;
   computer usable program code configured to maintain a data structure representing the degree to which a value of a measuring point can be an outlier;
   computer usable program code configured to measure an uncertainty in said data structure;
   computer usable program code configured to optimize window size by maximizing the uncertainty; and
   computer usable program code configured to detect outliers with a given threshold.

* * * * *